United States Patent
Al-Jabr

(10) Patent No.: US 10,620,002 B2
(45) Date of Patent: Apr. 14, 2020

(54) INCORPORATE WALL THICKNESS MEASUREMENT SENSOR TECHNOLOGY INTO AERIAL VISUAL INSPECTION INTRINSICALLY SAFE DRONES

(71) Applicant: Saudi Arabian Oil Company, Dhahran (SA)

(72) Inventor: Saad A. Al-Jabr, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 88 days.

(21) Appl. No.: 15/812,725

(22) Filed: Nov. 14, 2017

(65) Prior Publication Data
US 2019/0145763 A1 May 16, 2019

(51) Int. Cl.
*G01B 17/02* (2006.01)
*G01S 15/08* (2006.01)
*B64D 47/08* (2006.01)
*B64C 39/02* (2006.01)

(52) U.S. Cl.
CPC .......... *G01B 17/025* (2013.01); *B64C 39/024* (2013.01); *B64D 47/08* (2013.01); *G01B 17/02* (2013.01); *G01S 15/08* (2013.01); *B64C 2201/12* (2013.01); *B64C 2201/127* (2013.01); *B64C 2201/145* (2013.01); *B64C 2201/146* (2013.01)

(58) Field of Classification Search
CPC ...... G01B 17/025; B64C 39/024; B64D 47/08
USPC .......................................................... 73/632
See application file for complete search history.

(56) References Cited

U.S. PATENT DOCUMENTS 8,789,422 B2  7/2014  Ege et al.
2001/0007316 A1*  7/2001  Payne .................... B61F 19/06
                                                         213/220

(Continued)

FOREIGN PATENT DOCUMENTS

FR   2963431 A1   2/2012
FR   3036381 A1   11/2016

(Continued)

OTHER PUBLICATIONS

"AErial RObotic System for In-Depth Bridge Inspection by Contact" accessible as of Jul. 10, 2017 at the website http://www.aerobi.eu; 3 pages.

(Continued)

*Primary Examiner* — Tarun Sinha
(74) *Attorney, Agent, or Firm* — Bracewell LLP; Constance G. Rhebergen; Brian H. Tompkins

(57) ABSTRACT

Provided is an unmanned aerial vehicle for measuring the wall thickness of a structure. The unmanned aerial vehicle may be an intrinsically safe unmanned aerial vehicle and may include an arm having an electromagnetic acoustic transducer (EMAT) coupled to one end of the arm and a power and control assembly may be coupled to the other end of the arm as a counterweight. The power and control assembly may include an activation device for the EMAT, such as a proximity sensor. The EMAT may be coupled to a spring that compresses in response to a force normal to the wall being measured to prevent excessive force from being applied to the structure and the EMAT. Methods of measuring wall thickness using an unmanned aerial vehicle and a retrofit kit for an unmanned aerial vehicle are also provided.

17 Claims, 4 Drawing Sheets

(56) References Cited

U.S. PATENT DOCUMENTS

| | | | |
|---|---|---|---|
| 2007/0232919 A1* | 10/2007 | Pors | G01F 1/662 600/454 |
| 2015/0204821 A1 | 7/2015 | Adams et al. | |
| 2016/0144959 A1 | 5/2016 | Meffert | |
| 2016/0214715 A1 | 7/2016 | Meffert | |
| 2016/0216238 A1 | 7/2016 | Schubert et al. | |
| 2016/0272317 A1 | 9/2016 | Cho et al. | |
| 2016/0311529 A1 | 10/2016 | Brotherton-Ratcliffe et al. | |
| 2016/0334276 A1 | 11/2016 | Pluvinage | |
| 2018/0120196 A1* | 5/2018 | Georgeson | G01M 5/0008 |
| 2018/0297716 A1* | 10/2018 | Ni | B64D 47/08 |
| 2019/0094149 A1* | 3/2019 | Troy | G01M 5/0008 |

FOREIGN PATENT DOCUMENTS

| | | |
|---|---|---|
| KR | 101718310 A1 | 4/2017 |
| WO | 2012013878 A1 | 2/2012 |

OTHER PUBLICATIONS

"Creating drone behaviors to solve your problems" Digital Aerolus; available as of Oct. 4, 2017 at: http://www.digitalaerolus.com/; 8 pages.

"Eelume Subsea Intervention" available as of Oct. 4, 2017 at: https://eelume.com/; 5 pages.

"Flying, Swimming Drone Inspects DE Bridge" Paint Square Jul. 24, 2017; available as of Oct. 4, 2017 at: http://www.paintsquare.com/news/?fuseaction=view&id=17057&nl_versionid=2657; 4 pages.

"Intrinsically Safe Drone" accessible as of Jul. 10, 2017 at the website https://seeforge.com/product/intrinsicallysafedrone/; 3 pages.

"San Jorge Develops an Intrisically Safe Drone for Use in Explosive Atmospheres" accessible as of Jul. 10, 2017 at the website http://sanjorgetechnologicas.com/?p=18; 7 pages.

"Welcome to PETROBOT" accessible as of Jul. 10, 2017 at the website http://petrobotproject.eu, 4 pages.

APELLIX "Precision Controlled Aerial Robotics" available as of Oct. 4, 2017 at: http://www.apellix.com/; 3 pgs.

DuBose, Ben; "Drone Shows Promise in Measuring Coating Thickness" Materials Performance, Jul. 31, 2017; available as of Oct, 4, 2017 at: http://www.materialsperformance.com/articles/coating-linings/2017/08/drone-shows-promise-in-measuring-coating-thickness; 9 pages.

Mattar, Rami; "The Impact of Drones on Industrial Facilities" Inspectioneering Journal, accessible as of Jul. 24, 2017 a the website https://inspectioneering.com/journal/2017-04-24/6419/the-impact-of-drones-on-industrial-facilities; 2 pages.

Ruiz, Jerome; "Drone UT for Thickness Measurement" accessible as of Jul. 24, 2017 at the website https://www.linkedin.com/pulse/drone-ut-thickness-measurement-jerome-ruiz; 2 pages.

Ruiz, Jerome; "UT Drone Inspection" accessible as of Jul. 24, 2017 at the website https://www.linkedin.com/pulse/ut-drone-inspection-jerome-ruiz; 3 pages.

Tompkinson, William; "Are Drone Inspections Intrinsically Safe?" Industrial Skyworks Apr. 19, 2017; available as of Oct. 4, 2017 at: http://info.industrialskyworks.com/blog/are-drones-intrinsically-safe; 8 pages.

YouTube Video: https://www.youtube.com/watch?v=oaMTiZrE54g titled "drone ut x8" published Jul. 18, 2017 by flyingvision sarl.

YouTube Video: https://www.youtube.com/watch?v=vKtVvn8Fhak titled "UT Thickness Measurement With Drone in a Tank" published Jul. 20, 2017 by flyingvision sarl.

International Search Report and Written Opinion for related PCT application PCT/US2018/060965 dated Feb. 18, 2019; pp. 01-14.

Robertson et al. "Advancements in NDE for Utilities and the Petrochemical Industry through Electromagnetic Acoustic Transducers (EMATs)", SPIE, 1998, pp. 11, vol. 3398, SPIE.

* cited by examiner

INCORPORATE WALL THICKNESS MEASUREMENT SENSOR TECHNOLOGY INTO AERIAL VISUAL INSPECTION INTRINSICALLY SAFE DRONES

BACKGROUND

Field of the Disclosure

The present disclosure generally relates to inspection of components in hydrocarbon processing and transportation. More specifically, embodiments of the disclosure relate to the measurement of wall thickness of such components using unmanned aerial vehicles (UAV's).

Description of the Related Art

Hydrocarbon processing and transportation involves the use of numerous vessels, pipelines, and other components. The inspection and measurement of such components may be difficult due to the various location and hazard-related challenges. For example, some components may be remote and difficult to access. Existing techniques may require the use of scaffolding to inspect and measure such components. Additionally, components may be located in hazardous locations that may impose specific environmental and safety regulations and procedures, thus increasing the difficulty and cost of inspection and measurement.

SUMMARY

Embodiments of the disclosure generally relate to the determination of wall thickness of components such as vessels and pipelines using an unmanned aerial vehicle (UAV), also referred to as a "drone." Vessels and pipelines that store and transport hydrocarbons may be particularly sensitive to electricity generated by unmanned aerial vehicles and measurement apparatuses. In particular, electrostatic discharges, such as from static electricity, may ignite flammable hydrocarbons and result in fires or explosions.

Additionally, some vessel and pipelines may have exteriors coatings or layers applied intentionally or formed after environmental interactions (such as oxides). The measurement of physical attributes of such components, such as the thickness of a vessel wall or pipeline wall, may be affected by contact with the coatings or layers.

Embodiments of the disclosure include an intrinsically safe unmanned aerial vehicle having an electromagnetic acoustic transducer (EMAT) that does not require physical contact with the wall of a structure to determine the wall thickness.

In one embodiment, an unmanned aerial vehicle is provided that includes a body having a top and a bottom, an arm coupled to the bottom of the body and having a first end and a second end disposed opposite the first end, and an electromagnetic acoustic transducer coupled to the arm at the first end, the electromagnetic acoustic transducer configured to measure a thickness of a wall. The unmanned aerial vehicle also includes a proximity sensor coupled to the arm at the second end, the proximity sensor configured to activate the electromagnetic acoustic transducer in response to detection of the wall. In some embodiments, the sensor is an ultrasonic sensor. In some embodiments, the unmanned aerial vehicle includes an assembly coupled to the arm at the second end such that, the assembly includes the proximity sensor. In some embodiments, the assembly at the second end of the arm acts as a counterweight to the electromagnetic acoustic transducer at the first end of the arm. In some embodiments, the assembly includes a battery. In some embodiments, the assembly includes a transmitter. In some embodiments, the unmanned aerial vehicle includes a gimbal at the bottom of the body, such that the arm is coupled to the bottom of the body via the gimbal. In some embodiments, the unmanned aerial vehicle includes a gimbal at the top of the body and a camera coupled to the top of the body via the gimbal. In some embodiments, the electromagnetic acoustic transducer is coupled to a spring, such that the spring configured to compress in a direction normal to a surface of the wall when the electromagnetic acoustic transducer physically contacts the wall. In some embodiments, the unmanned aerial vehicle is an intrinsically safe unmanned aerial vehicle.

In another embodiment, a method of determining a thickness of a wall is provided. The method includes positioning an unmanned aerial vehicle adjacent to the wall at a position. The unmanned aerial vehicle includes a body having a top and a bottom, an arm coupled to the bottom of the body and having a first end and a second end disposed opposite the first end, and an electromagnetic acoustic transducer coupled to the arm at the first end, the electromagnetic acoustic transducer configured to measure the thickness of the wall. The unmanned aerial vehicle further also a sensor coupled to the arm at the second end, the sensor configured to activate the electromagnetic acoustic transducer in response to detection of the wall, such that the position activates the sensor. The method further includes measuring the thickness of the wall using the electromagnetic acoustic transducer. In some embodiments, the sensor is an ultrasonic sensor. In some embodiments, the unmanned aerial vehicle includes an assembly coupled to the arm at the second end such that, the assembly includes the proximity sensor. In some embodiments, the assembly at the second end of the arm acts as a counterweight to the electromagnetic acoustic transducer at the first end of the arm. In some embodiments, the assembly includes a battery. In some embodiments, the assembly includes a transmitter. In some embodiments, the assembly is connected to the electromagnetic acoustic transducer via a cable traversing a length of the arm and configured to provide for communication between the assembly and the electromagnetic acoustic transducer. In some embodiments, the unmanned aerial vehicle includes a gimbal at the bottom of the body, wherein the arm is coupled to the bottom of the body via the gimbal. In some embodiments, the electromagnetic acoustic transducer is coupled to a spring that is configured to compress in a direction normal to a surface of the wall when the electromagnetic acoustic transducer physically contacts the wall. In some embodiments, positioning an unmanned aerial vehicle adjacent to the wall at the position includes positioning the unmanned aerial vehicle adjacent such that the electromagnetic acoustic transducer is not in physical contact with the wall. In some embodiments, the method includes transmitting the measured thickness to a computer remote from the unmanned aerial vehicle. In some embodiments, the wall includes a coating on a surface of the wall. In some embodiments, the coating is a metal oxide. In some embodiments, the unmanned aerial vehicle is an intrinsically safe unmanned aerial vehicle.

In another embodiment, a retrofit kit for an unmanned aerial vehicle is provided. The retrofit kit includes an arm configured to couple to a body of the unmanned aerial vehicle, the arm having a first end and a second end disposed opposite the first end. The retrofit kit further includes an electromagnetic acoustic transducer configured to be coupled to the arm at the first end, the electromagnetic acoustic transducer configured to measure a thickness of a wall. The retrofit kit also includes a proximity sensor coupled to the arm at the second end, the proximity sensor configured to activate the electromagnetic acoustic transducer in response to detection of the wall. In some embodiments, the proximity sensor is an ultrasonic sensor. In some embodiments, the retrofit kit includes an assembly coupled to the arm at the second end such that the assembly includes the proximity sensor. In some embodiments, the assembly at the second end of the arm acts as a counterweight to the electromagnetic acoustic transducer at the first end of the arm. In some embodiments, the arm is configured to couple to the body of the unmanned aerial vehicle via a gimbal.

DETAILED DESCRIPTION

Figure 1:
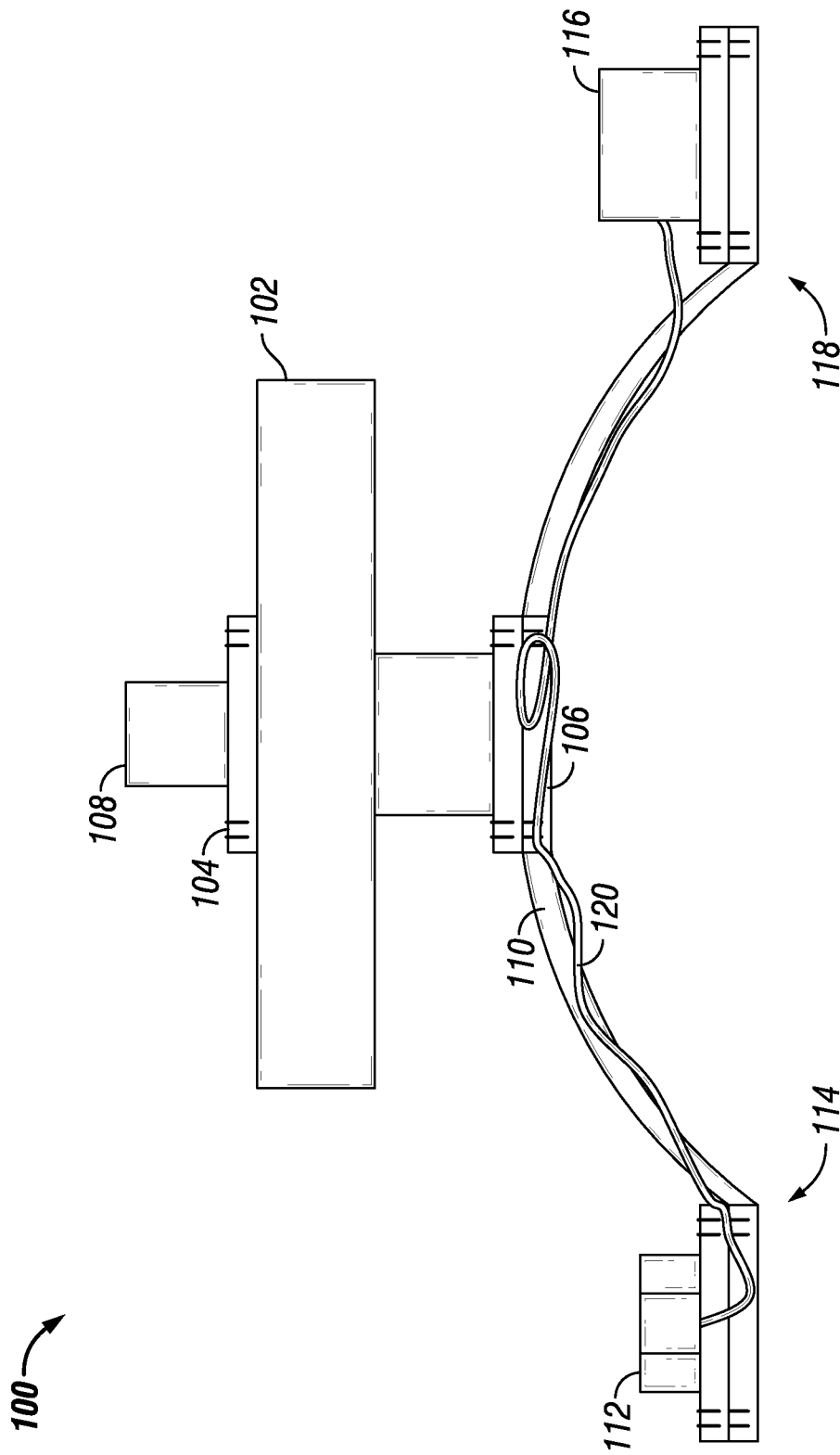
FIG. 1 is a schematic diagram of an unmanned aerial vehicle for measuring the thickness of a wall in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include an unmanned aerial vehicle (UAV) for measuring the wall thickness of a structure. The unmanned aerial vehicle may be an intrinsically safe unmanned aerial vehicle having a minimized ignition risk with regard to flammable fluids such as hydrocarbons for use in hazardous environments. The unmanned aerial vehicle may include an arm having an electromagnetic acoustic transducer (EMAT) coupled to one end of the arm. The unmanned aerial vehicle includes a power and control assembly coupled to the other end of the arm and may provide a counterweight to the EMAT. The power and control assembly may include an activation device for the EMAT, such as a proximity sensor that sends a signal to the EMAT when the sensor detects the presence of the wall of a structure (for example, when the sensor is in a specific proximity to the wall) of a structure. The unmanned aerial vehicle may be a wirelessly operated vehicle or may be a tethered vehicle with a wired connection to a station on the ground.

In some embodiments, the unmanned aerial vehicle may fly to a measurement location on a structure. The measurement location may be along a wall of a structure, such as wall of a pipeline, vessel, or other structure. The unmanned aerial vehicle may be positioned to measure the thickness of the wall at the measurement location, such that the activation device for the EMAT is activated (for example, the unmanned aerial vehicle may be positioned at a specific proximity to the wall of the structure to activate a proximity sensor). The EMAT may measure the thickness of the wall, and the wall thickness may be transmitted, such as to a remote base station. In some embodiments, the EMAT may be coupled to a spring that may compress in response to a force normal to the wall to be measured to prevent excessive force from being applied to the structure and the EMAT.

Advantageously, the EMAT of the unmanned aerial vehicle does not require physical contact with the structure to measure the wall thickness and does not require surface cleaning of the wall to be measured. Moreover, the wall thickness may be measured through coatings (such as oxides) on the wall to be measured. In some embodiments, an intrinsically safe unmanned aerial vehicle may enable the measurement of structures in hazardous locations and facilities (for example, refineries, gas-oil separation plants, or other hydrocarbon processing facilities). The unmanned aerial vehicle may also provide for measurement of structures that are located in remote locations, located in inaccessible locations, or that are difficult to access (for example, structures that require scaffolding to obtain measurements).

FIG. 1 depicts an unmanned aerial vehicle 100 for determining wall thickness in accordance with an embodiment of the disclosure. The unmanned aerial vehicle 100 may be an intrinsically safe unmanned aerial vehicle. As used herein, the term "intrinsically safe" refers to a unmanned aerial vehicle having a minimized ignition risk with regard to flammable fluids such as hydrocarbons for use in hazardous environments (for example, Atmospheres Explosibles (ATEX) Zone 0 or International Electrotechnical Commission Explosive (IECEx) Class 1 Division 1 environments). As will be appreciated, for example the unmanned aerial vehicle 100 may include components designed to minimize ignition risk of flammable fluids. Such components may include internal and sealed batteries, brushless motors, sealed wires and connections, isolated wires and connectors, current limiter circuits, voltage clamping circuits, and the like.

The unmanned aerial vehicle 100 may have a suitable propulsion system and associated components (not shown). For example, in some embodiments the unmanned aerial vehicle 100 may be a mono-copter or a multirotor unmanned aerial vehicle such as a bi-copter, a quadcopter. In some embodiments, the unmanned aerial vehicle 100 may include vertical take off and landing (VTOL) capability.

The unmanned aerial vehicle 100 may include a main body 102, a top gimbal 104, and a bottom gimbal 106. The unmanned aerial vehicle 100 may include a camera 108 coupled to the top gimbal 104 and an arm 110 coupled to the bottom gimbal 106. As will be appreciated, the top gimbal 104 may include one or more motors and provide for movement of the camera 108 with reference to two axes (for example, pitch and roll) or three axes (for example, yaw, pitch, and roll). The bottom gimbal 106 may also include one or more motors and provide for movement of the arm 110 with reference to two axes (for example, pitch and roll)

An electromagnetic acoustic transducer (EMAT) 112 may be coupled to a first end 114 of the arm 110. A power and control assembly 116 may be coupled to a second end 118 of the arm 110. As shown in FIG. 1, the power and control assembly 116 may be electrically connected to the EMAT 112 via a wired connection 120 (for example, one or more cables). In such embodiments, power and control signals (for example, an activation signal) may be transmitted via the wired connection 120.

In some embodiments, the arm 110 may be formed from a composite material such that the arm 110 is relatively lightweight and does not substantially increase the weight of the unmanned aerial vehicle 100. The arm 110 may be of a weight such that the total weight of the arm 110 and the additional components is at or less than a load requirement of an unmanned vehicle. For example, the arm 100 may be of a weight that does not impair the flight capability (for example, flying altitude, velocity, etc.) of the unmanned aerial vehicle 100.

The power and control assembly 116 may include various components that power the EMAT 112 and control activation of the EMAT 112. The power and control assembly 116 may include a battery, an activation device for the EMAT 112, a data storage device, and a transmitter, the details of which are discussed further below. The power and control assembly 116 may, in some embodiments, be of sufficient weight to provide a counterbalance to the EMAT 112. In such embodiments, the weight of the EMAT 112 at the first end 114 of the arm 110 may be counterbalanced by the weight of the power and control assembly 116 at the second end 118 of the arm. In other embodiments, some or all of the components in the power and control assembly 116 may instead be located in the vehicle body 102. In such embodiments, the second end 118 may include a weight (for example, a metallic, composite, or plastic weight) to provide a counterbalance to the EMAT 112 at the first end 114 of the arm 110. The arm 110 may have a length sufficient to ensure the propellers or other flight propulsion components of the unmanned aerial vehicle 100 do not touch the arm 110, the EMAT 112, or the power and control assembly 116.

The EMAT 112 may be an intrinsically safe EMAT, according to the intrinsically safe capability discussed above. Similarly, the power and control assembly 116 may be an intrinsically safe assembly, according to the intrinsically safe capability discussed above.

In some embodiments, the EMAT 112 may be coupled to a spring that compresses when the EMAT 112 contacts with a surface such that a force normal to the surface compresses the spring. The spring may prevent excessive forces from being applied to the structure being measured or the EMAT 112, as forces above a certain amount will result in compression of the spring and reduction of the force applied to the surface by the unmanned aerial vehicle 100. In some embodiments, the power and control assembly 116 may be coupled to a spring that behaves in a similar manner.

In some embodiments, the arm 110, the EMAT 112, and the power and control assembly 116 may retrofitted to an existing unmanned aerial vehicle to add wall thickness measurement capability to the unmanned aerial vehicle. In some embodiments, a retrofit kit for an existing unmanned aerial vehicle may be provided that includes the EMAT 112, and the power and control assembly 116, such that the retrofit kit provides for installation of the components to the unmanned aerial vehicle.

In some embodiments, the unmanned aerial vehicle 100 may be a wireless unmanned aerial vehicle having wireless communication with a base station (for example, a controller). In other embodiments, the unmanned aerial vehicle 100 may be a tethered such that the unmanned aerial vehicle 100 communicates over a wired connection with a base station (for example, a controller). In some embodiments, power may transferred from a ground-based power source to the unmanned aerial vehicle 100 over the wired connection. As will be appreciated, in some embodiments the unmanned aerial vehicle 100 may be a tethered unmanned aerial vehicle to reduce payload requirements of the unmanned aerial vehicle 100 and maximize flight time and duty cycle.

Figure 2A:
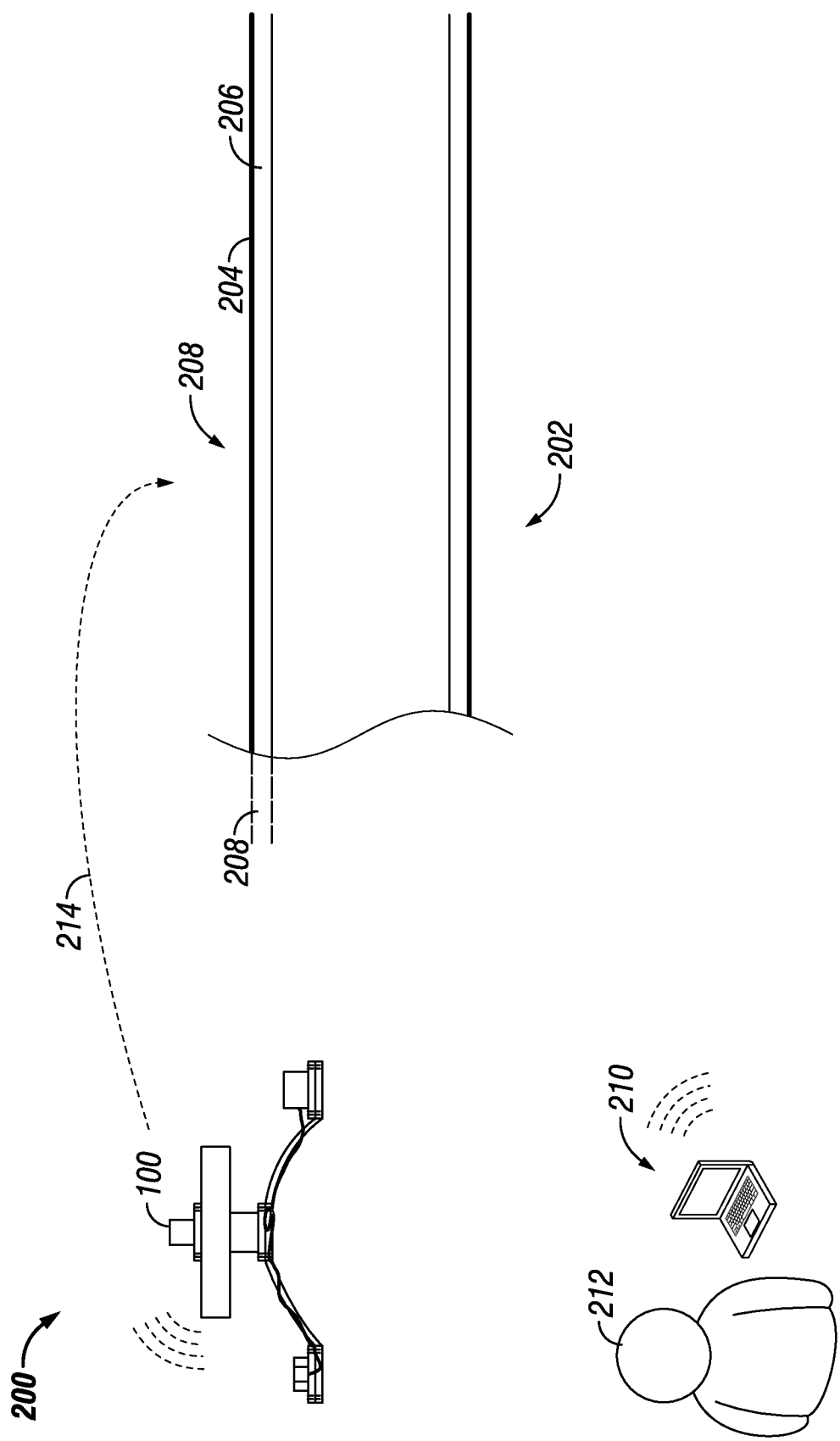
FIGS. 2A and 2B are schematic diagrams of an environment and operation of the unmanned aerial vehicle of FIG. 1 engaged in measurement of a wall thickness of a structure in accordance with an embodiment of the disclosure.
Figure 2B:
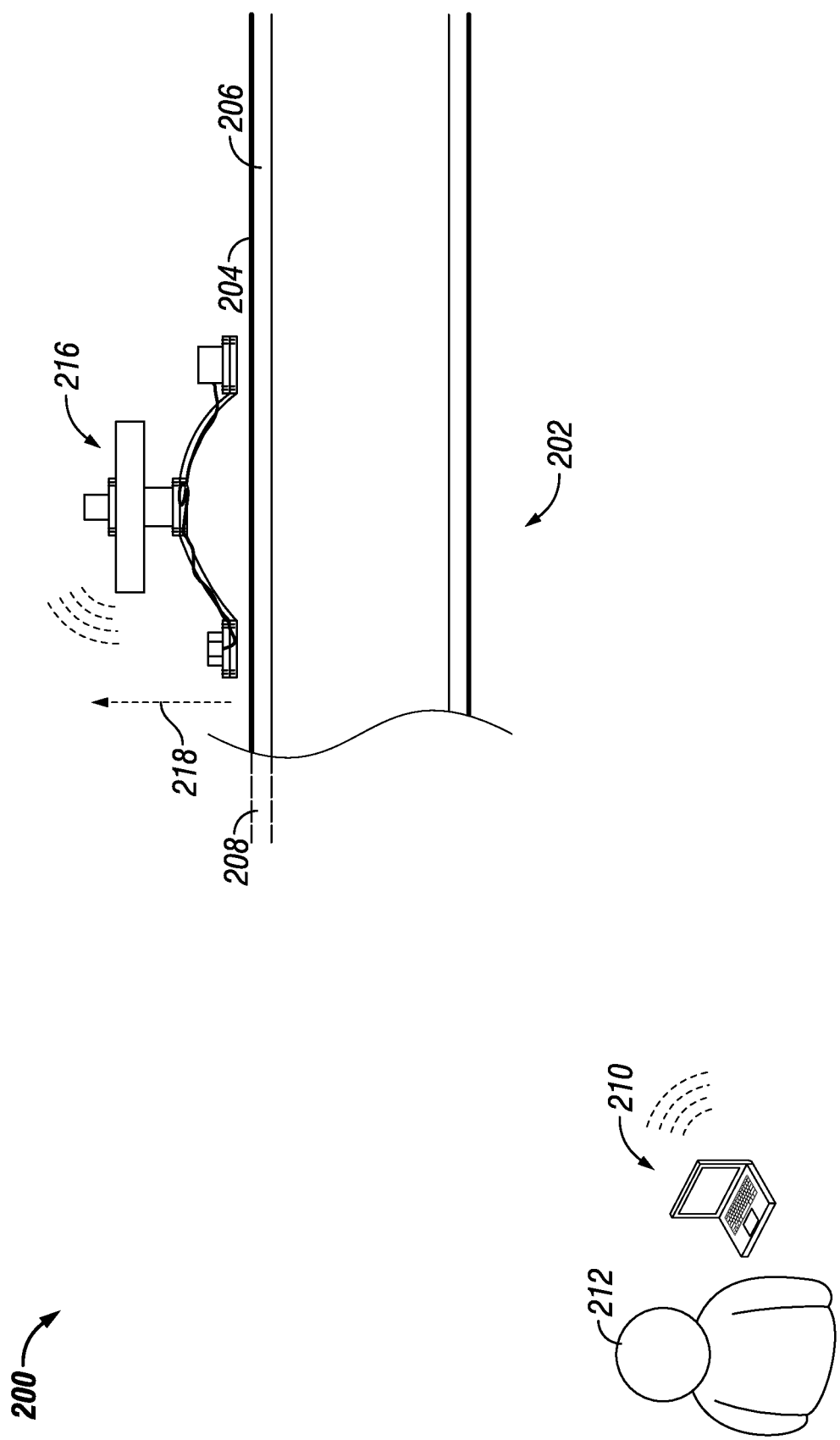

FIGS. 2A and 2B depict an environment 200 illustrating operation of the unmanned aerial vehicle 100 engaged in measurement of a wall thickness of a structure (for example, a pipeline 202) in accordance with an embodiment of the disclosure. The pipeline 202 may include a coating 204 and a wall 206 having a wall thickness 208. In some embodiments, the pipeline 202 may be located in a location that is inaccessible or difficult to access by technicians, plant operators, or other personnel. For example, the pipeline 202 may be located at a relatively high elevation, adjacent to other components or equipment, in a hazardous location, or any combination thereof. As will be appreciated, the pipeline 202 is one example of a structure that may be measured by the unmanned aerial vehicle 100. Other suitable structures may include, for example, vessels, tanks, pipes, towers, and other structures having walls with a measureable thickness. Such structures may be located in hazardous locations (for example, hydrocarbon processing facilities). For example, the pipeline 202 may be pipeline for transporting crude oil or other hydrocarbons.

In some embodiments, the unmanned aerial vehicle 100 may be associated with and, in some embodiments, may communicate with, a base station 210. In some embodiments, an operator 212 may communicate with the unmanned aerial vehicle 200 via the base station 208. In some embodiments, the unmanned aerial vehicle 100 may be remotely piloted by the operator 210 via the base station 208. In other embodiments, the unmanned aerial vehicle 100 may engage in autonomous flight using locations determined according to a flight plan. In such embodiments, for example, the unmanned aerial vehicle 100 may use a satellite-based navigation system. For example, the satellite-based navigation system may be the Global Positioning System (GPS), the Globalnaya Navigazionnaya Sputnikovaya Sistema (GLONASS), or other suitable systems.

As shown in FIGS. 2A and 2B, the unmanned aerial vehicle 100 may follow a flight path 214 to a measurement location 215 on the pipeline 202. The flight path 214 may be a flight path determined by the operator 210 and communicated to the unmanned aerial vehicle 100 via the base station 210. For example, the unmanned aerial vehicle 100 may use one or more waypoints on a map to autonomously follow the flight path 214. In other embodiments, the flight path 214 may illustrative of the path flown by the unmanned aerial vehicle 100 when remotely piloted by, for example, the operator 212 via the base station 210.

As shown in FIG. 2B, the unmanned aerial vehicle 100 may fly to a position 216 suitable for determining the thickness 208 of the wall 206 at the measurement location 208. For example, as shown in FIG. 2B, the unmanned aerial vehicle 100 may be positioned adjacent to the wall 206 such that the EMAT sensor of the unmanned aerial vehicle 100 is positioned to determine the thickness 208 of the wall 206. As discussed herein, when in the position 216, the unmanned aerial vehicle 100 is not in physical contact with the wall 206 and may determine the thickness 208 of the wall without such physical contact. In some embodiments, when in position 216, the unmanned aerial vehicle 100 may inadvertently make physical contact with the coating 204 for a short time period, such as when the unmanned aerial vehicle 100 is being positioned in the position 216. As discussed herein the spring coupled to the EMAT of the unmanned aerial vehicle 100 may prevent excessive force from being applied to the EMAT or the wall 206 when the unmanned aerial vehicle 100 is in position 212. In such me embodiments, if the unmanned aerial vehicle 100 makes contacts the pipeline 202, a spring coupled to the EMAT may compress in a direction normal to the surface of the pipeline 202 (as indicated by force arrow 218). The force may compress the spring such in the direction indicated by arrow 218 such that the force applied to the pipeline 202 may be reduced to avoid the application of excessive force to the pipeline 202.

Once in position 212, the unmanned aerial vehicle 100 may measure the thickness 208 of the wall 206. The EMAT may be activated by various mechanisms. In some embodiments, the EMAT may be activated by a proximity sensor located in the power and control assembly 116 at the second end 118 of the arm 110. In other embodiments, the EMAT may be activated via by the operator 210 by an activation signal communicated by the base station 208. Once activated, the EMAT may measure the thickness 208 of the wall 206, and the measured thickness may be stored in a data storage device of the power and control assembly 116. In some embodiments, the measured thickness may be transmitted to the base station 208 using a transmitter of the unmanned aerial vehicle 100. In some embodiments, multiple wall thickness measurements may be performed. In such embodiments, the multiple wall thickness measurements may be stored, and transmitted to the base station 208. In other embodiments, the unmanned aerial vehicle 100 may determine an average of the multiple wall thickness measurements, and the average wall thickness measurement may be transmitted to the base station 208.

Figure 3:
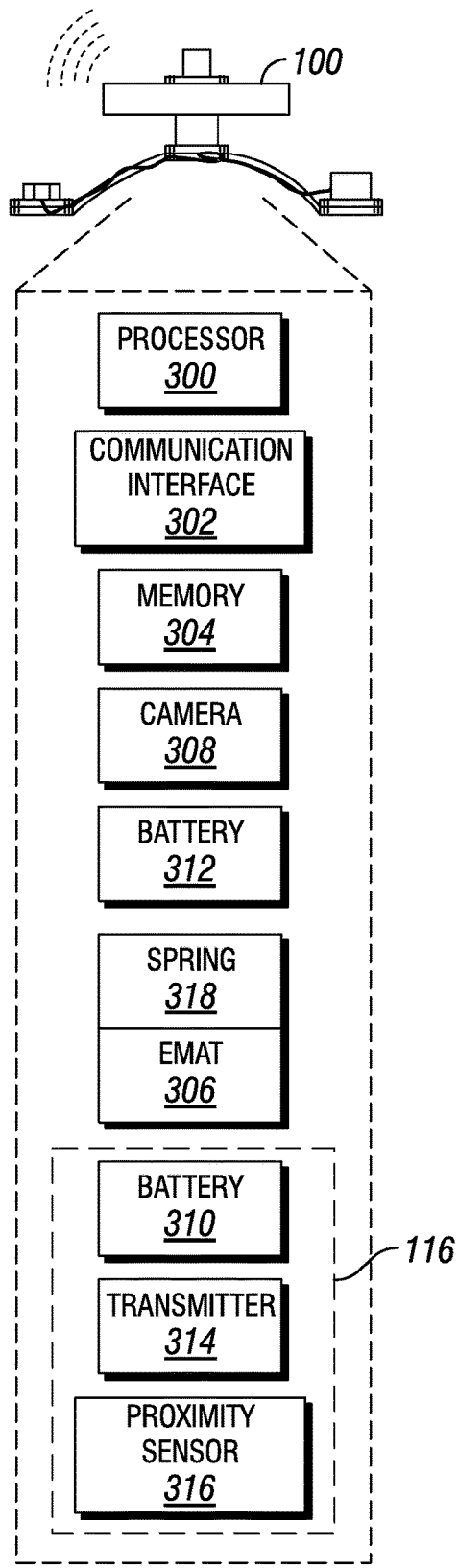
FIG. 3 is a schematic diagram of components of the unmanned aerial vehicle of FIG. 1 in accordance with an embodiment of the disclosure.

FIG. 3 depicts various components of the unmanned aerial vehicle 100, although it should be appreciated that some components may be omitted. Other embodiments of the unmanned aerial vehicle 100 may include additional components not illustrated in FIG. 3. As shown in FIG. 3, the unmanned aerial vehicle 100 may include a processor 300 (for example, one or more processors), a communication interface 302, a memory 304 (for example, one or more memories), an EMAT 306, a camera 308, batteries 310 and 312, a transmitter 314, and a proximity sensor 316.

The processor 300 may provide the processing capability to execute the operating system, flight logic, and other functions of the unmanned aerial vehicle 100. For example, the processor 300 may execute various modules stored in the memory 304 and provide commands to the unmanned aerial vehicle 100, such as for navigation and flight. The processor 300 may include one or more processors and may include microprocessors, application-specific integrated circuits (ASICs), or any combination thereof. In some embodiments, the processor 300 may include one or more reduced instruction set (RISC) processors, such as those implementing the Advanced RISC Machine (ARM) instruction set. Additionally, the processor 300 may include single-core processors and multicore processors The communication interface 302 may include any number of receivers, transmitters, and transceivers for communication using suitable wireless communication protocols and technologies. For example, the communication interface 302 may include a receiver for communication with a satellite-based navigation system (for example, the Global Positioning System (GPS), Global Navigation Satellite System (GLONASS), Galileo, etc.). The communication interface 302 may include a receiver and transmitter for communication with a base station via suitable radio frequencies or a remote network system (for example, a satellite-based network). In some embodiments, the communication interface 302 may include a receiver for receiving remote control commands from a base station. In some embodiments, as discussed above, unmanned aerial vehicle may include a transmitter 314 for transmitting the wall thickness measurements to a computer, such as a base station. In some embodiments, for example, the transmitter may include telemetry capability and may transmit the wall thickness measurements as telemetry data via suitable radio frequencies or other wireless technologies. As will be appreciated, in some embodiments the transmitter 314 may be omitted or may be a part of the communication interface 302. In other embodiments, as discussed above, the unmanned aerial vehicle 100 may be a tethered unmanned aerial vehicle that receives and transmits data via a wired connection. In such embodiments, the unmanned aerial vehicle 100 may omit any wireless communication components.

The memory 304 (which may include one or more tangible non-transitory computer readable storage mediums) may include volatile memory (such as random access memory (RAM)) and non-volatile memory (such as solid-state memory) accessible by the processor 300 and other components of the unmanned aerial vehicle 100. For example, the memory 306 may store executable computer code, such as the firmware for the unmanned aerial vehicle 100, an operating system for the unmanned aerial vehicle 100, and any other programs or other executable code for providing functions of the unmanned aerial vehicle 100. The memory 304 may include various modules and other components for enabling operation and flight of the unmanned aerial vehicle 100. In some embodiments, the storage may include store wall thickness measurements obtained using the EMAT.

The EMAT 306 may include one or more EMATs for measuring the thickness of a wall via acoustic signals. As will be appreciated, the EMAT 306 may generate and receive non-contact acoustic signals. The acoustic signals may be used to measure the thickness of a wall in accordance with techniques known in the art. An EMAT suitable for use in the unmanned aerial vehicle 100 may include a magnet (for example, a permanent magnet or an electromagnet) and an electric coil. The electric coil may be powered via a power source of the unmanned aerial vehicle 100, such as the battery 310.

In some embodiments, the unmanned aerial vehicle 100 may also include a camera 308. The camera 308 may capture still images, video, or both of areas surrounding the unmanned aerial vehicle 100 (for example, the area in front the unmanned aerial vehicle). The camera 308 may be used to provide visual confirmation of a flight path of the unmanned aerial vehicle 100. In some embodiments, the camera 308 may capture still images, video, or both of a pipeline, vessel, or other structure to enable visible inspection of the structure when the unmanned aerial vehicle 100 in a position adjacent to the structure. In such embodiments, the camera 308 may be used to provide visual confirmation of a measurement location on a structure.

The unmanned aerial vehicle 100 may also include a battery 312 for powering the unmanned aerial vehicle 100 and the components of the vehicle 100. For example, the battery 312 may include multiple batteries, such as a battery located in the body of the unmanned aerial vehicle 100 for powering the operating and flight of the unmanned aerial vehicle 100. The unmanned aerial vehicle 100 may also include a second battery 310 located at the second end of the arm for powering the EMAT 306 and other components. In some embodiments, the unmanned aerial vehicle 100 may include a single battery located in the body that may be connected to power the EMAT 306 and other components located on the arm. In some embodiments, the EMAT 306 may be coupled to a spring 318 that operates in the manner described above.

As mentioned above, in some embodiments the unmanned aerial vehicle 100 may include an activation mechanism for the EMAT. In some embodiments, as shown in FIG. 3, the unmanned aerial vehicle 100 may include a proximity sensor 316. The proximity sensor 316 may be an infrared sensor, an ultrasonic sensor, a LIDAR sensor, or other suitable proximity sensors. The proximity sensor 316 may be configured to detect a proximity (for example, a distance from) a wall. The detected proximity may be used to activate the EMAT 306 via a signal transmitted over the wired connection 120. In some embodiments, a signal generated by the proximity sensor 316 may processed before being transmitted over the wired connection 120, such that the processed signal is suitable for activating the EMAT 306.

In some embodiments, the battery 310, the transmitter 314, and the proximity sensor 316 may be located in the power and control assembly 116. In other embodiments, one or any combination of these components may be located in the body of the unmanned aerial vehicle 100.

Figure 4:
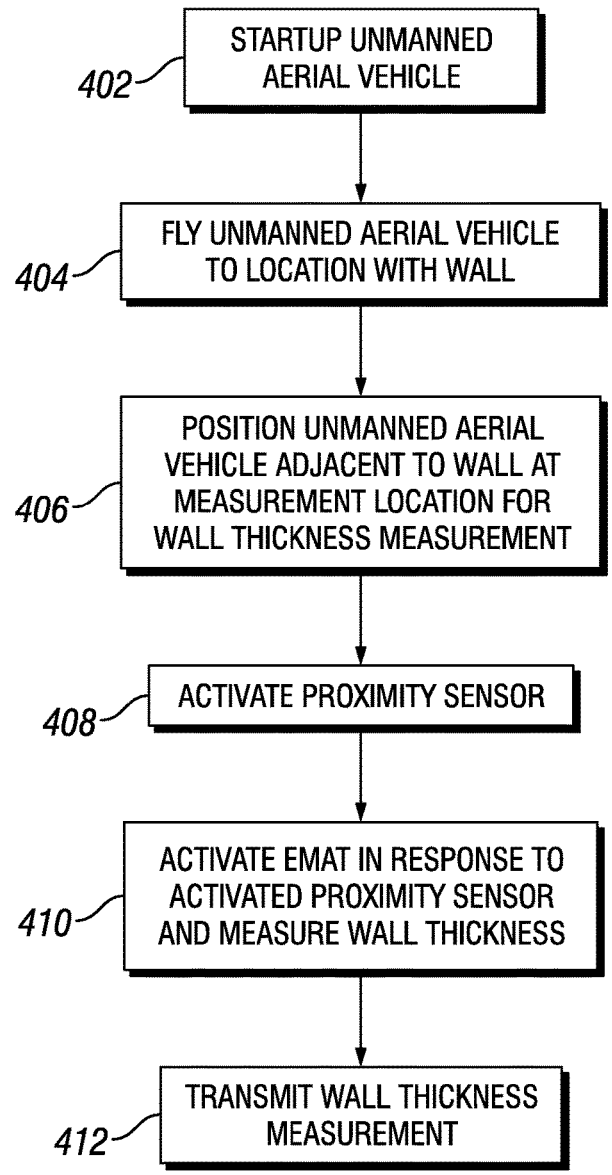
FIG. 4 is a block diagram of a process for measuring wall thickness using the unmanned aerial vehicle of FIG. 1 in accordance with an embodiment of the disclosure.

FIG. 4 is a block diagram of a process 400 for measuring the wall thickness of a structure using the unmanned aerial vehicle described herein in accordance with an embodiment of the disclosure. Initially, an unmanned aerial vehicle may undergo a startup sequence (block 402). For example, the startup may include powering on the unmanned aerial vehicle, initializing electronic components of the unmanned aerial vehicle, etc. For example, electric components such as an EMAT, a camera, a transmitter, and so on may be initialized to ensure proper operation.

Next, the unmanned aerial vehicle may fly to a measurement location at a wall to be measured (block 404). For example, in some embodiments, the unmanned aerial vehicle may be remotely piloted to the location. In other embodiments, the unmanned aerial vehicle may be programmed with a flight path that enables the unmanned aerial vehicle to autonomously fly to the location. The unmanned aerial vehicle may be positioned adjacent to a wall at the measurement location to measure the thickness of the wall (block 406). In some embodiments, the position of the unmanned aerial vehicle may activate a proximity sensor located at an end of arm coupled to the unmanned aerial vehicle (block 408), when the proximity sensor detects the presence of the wall.

As discussed herein, the EMAT may be activated in response to the activated proximity sensor to measure the thickness of the wall at the measurement location (block 410). In other embodiments, the EMAT may be activated by an operator via a signal transmitted to the unmanned aerial vehicle. As also discussed herein, the EMAT may measure the thickness of the wall without physical contact with the wall.

In some embodiments, the wall thickness measurement may be transmitted (block 412), such as to as a remote computer (for example, a base station associated with the base station). In other embodiments, the unmanned aerial vehicle may store a wall thickness measurement and the measurement may be retrieved when the unmanned aerial vehicle returns to a base location. In some embodiments, multiple wall thickness measurements may be obtained to determine an average wall thickness for a wall. For example, the multiple measurements may be transmitted to a computer, such as a base station, and an average determined from the multiple measurements. In some embodiments, the average may be determined by the unmanned aerial vehicle and the average wall thickness measurement may be transmitted to a computer, such as a base station. In some embodiments, multiple wall thickness measurements may be obtained at multiple positions along a wall. For example, a first wall thickness measurement may be performed using the EMAT of the unmanned aerial vehicle, after which the unmanned aerial vehicle may fly to a different position along the wall to perform a second wall thickness measurement.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. An unmanned aerial vehicle, comprising:
a body having a top and a bottom;
an arm coupled to the bottom of the body, the arm having a first end and a second end disposed opposite the first end;
a gimbal at the bottom of the body, wherein the arm is coupled to the bottom of the body via the gimbal such that the gimbal provides for movement of the arm with reference to two axes;
an electromagnetic acoustic transducer coupled to the arm at the first end, the electromagnetic acoustic transducer configured to measure a thickness of a wall without physical contact with the wall;
a proximity sensor coupled to the arm at the second end and configured to communicate with the electromagnetic acoustic transducer via a cable traversing a length of the arm, the proximity sensor configured to activate the electromagnetic acoustic transducer in response to detection of the wall, wherein the proximity sensor comprises an ultrasonic sensor; and
an assembly coupled to the arm at the second end, the assembly comprising the proximity sensor, wherein the assembly at the second end of the arm is configured to act as a counterweight to the electromagnetic acoustic transducer at the first end of the arm.

2. The unmanned aerial vehicle of claim 1, wherein the assembly comprises a battery.

3. The unmanned aerial vehicle of claim 1, wherein the assembly comprises a transmitter.

4. The unmanned aerial vehicle of claim 1, comprising:
a gimbal at the top of the body; and
a camera coupled to the top of the body via the gimbal.

5. The unmanned aerial vehicle of claim 1, wherein the electromagnetic acoustic transducer is coupled to a spring, the spring configured to compress in a direction normal to a surface of the wall when the electromagnetic acoustic transducer physically contacts the wall.

6. The unmanned aerial vehicle of claim 1, wherein the unmanned aerial vehicle comprises an intrinsically safe unmanned aerial vehicle.

7. A method of determining a thickness of a wall, comprising:
   positioning an unmanned aerial vehicle adjacent to the wall at a position, the unmanned aerial vehicle comprising:
      a body having a top and a bottom;
      an arm coupled to the bottom of the body, the arm having a first end and a second end disposed opposite the first end;
      a gimbal at the bottom of the body, wherein the arm is coupled to the bottom of the body via the gimbal such that the gimbal provides for movement of the arm with reference to two axes;
      an electromagnetic acoustic transducer coupled to the arm at the first end, the electromagnetic acoustic transducer configured to measure the thickness of the wall without physical contact with the wall;
      a proximity sensor coupled to the arm at the second end and configured to communicate with the electromagnetic acoustic transducer via a cable traversing a length of the arm, the proximity sensor configured to activate the electromagnetic acoustic transducer in response to detection of the wall, wherein the proximity sensor comprises an ultrasonic sensor; and
      an assembly coupled to the arm at the second end, the assembly comprising the proximity sensor, wherein the assembly at the second end of the arm is configured to act as a counterweight to the electromagnetic acoustic transducer at the first end of the arm; and
   measuring the thickness of the wall using the electromagnetic acoustic transducer.

8. The method of claim 7, wherein the unmanned aerial vehicle comprises an assembly coupled to the arm at the second end, the assembly comprising the proximity sensor.

9. The method of claim 7, wherein the assembly comprises a battery.

10. The method of claim 7, wherein the assembly comprises a transmitter.

11. The method of claim 7, wherein the electromagnetic acoustic transducer is coupled to a spring, the spring configured to compress in a direction normal to a surface of the wall when the electromagnetic acoustic transducer physically contacts the surface.

12. The method of claim 7, wherein positioning an unmanned aerial vehicle adjacent to the wall at the position comprising positioning the unmanned aerial vehicle adjacent such that the electromagnetic acoustic transducer is not in physical contact with the wall.

13. The method of claim 7, comprising transmitting the measured thickness to a computer remote from the unmanned aerial vehicle.

14. The method of claim 7, wherein the wall comprises a coating on a surface.

15. The method of claim 14, wherein the coating comprises a metal oxide.

16. The method of claim 7, wherein the unmanned aerial vehicle comprises an intrinsically safe unmanned aerial vehicle.

17. A retrofit kit for an unmanned aerial vehicle, comprising:
   an arm configured to couple to the unmanned aerial vehicle, the arm having a first end and a second end disposed opposite the first end;
   a gimbal configured to couple to the bottom of the body, wherein the arm is coupled to the bottom of the body via the gimbal such that the gimbal provides for movement of the arm with reference to two axes;
   an electromagnetic acoustic transducer configured to be coupled to the arm at the first end, the electromagnetic acoustic transducer configured to measure a thickness of a wall without physical contact with the wall;
   a proximity sensor coupled to the arm at the second end and configured to communicate with the electromagnetic acoustic transducer via a cable traversing a length of the arm, the proximity sensor configured to activate the electromagnetic acoustic transducer in response to detection of the wall, wherein the proximity sensor comprises an ultrasonic sensor; and
   an assembly coupled to the arm at the second end, the assembly comprising the proximity sensor, wherein the assembly at the second end of the arm is configured to act as a counterweight to the electromagnetic acoustic transducer at the first end of the arm.

* * * * *